US010419441B2

(12) United States Patent
Chen et al.

(10) Patent No.: US 10,419,441 B2
(45) Date of Patent: Sep. 17, 2019

(54) CBR-BASED NEGOTIATION RBAC METHOD FOR ENHANCING UBIQUITOUS RESOURCES MANAGEMENT

(71) Applicant: Asia University, Taichung (TW)

(72) Inventors: Hsing-Chung Chen, Taichung (TW); Shian-Shyong Tseng, Hsinchu (TW); Li-Ling Hu, Chiayi (TW); Yen-Tsung Lin, Tianzhong Township (TW)

(73) Assignee: Asia University, Taichung (TW)

( * ) Notice: Subject to any disclaimer, the term of this patent is extended or adjusted under 35 U.S.C. 154(b) by 190 days.

(21) Appl. No.: 15/612,203

(22) Filed: Jun. 2, 2017

(65) Prior Publication Data
US 2018/0159862 A1 Jun. 7, 2018

(30) Foreign Application Priority Data

Dec. 2, 2016 (TW) .............................. 105140007 A

(51) Int. Cl.
*H04L 29/06* (2006.01)
(52) U.S. Cl.
CPC .................................. *H04L 63/105* (2013.01)
(58) Field of Classification Search
None
See application file for complete search history.

(56) References Cited

U.S. PATENT DOCUMENTS

| 9,319,415 | B2* | 4/2016 | Lietz | H04L 63/105 |
| 9,900,322 | B2* | 2/2018 | Lietz | H04L 63/105 |
| 2014/0223561 | A1* | 8/2014 | Mitola, III | G06F 21/56 726/23 |
| 2017/0242663 | A1* | 8/2017 | Abu Hassan | G06F 8/10 |

FOREIGN PATENT DOCUMENTS

| CN | 103093045 A | * | 5/2013 |
| CN | 104660599 A | * | 5/2015 |

* cited by examiner

*Primary Examiner* — Michael R Vaughan
(74) *Attorney, Agent, or Firm* — Wang Law Firm, Inc.

(57) ABSTRACT

A CBR-based negotiation RBAC method for ubiquitous resources management is described. The method, which is applicable to serving servers, includes steps of inquiring for a similar case in a case base in order to obtain an initial case, performing a REUSE procedure or a REVISE negotiating procedure on the initial case to assign at least one appropriate role set consisting of a local role and a virtual role, performing a local role and virtual role fitting procedure to fit the local role and the virtual role, and performing a determining and retaining procedure to meet the requirements of users during the negotiation process.

4 Claims, 1 Drawing Sheet

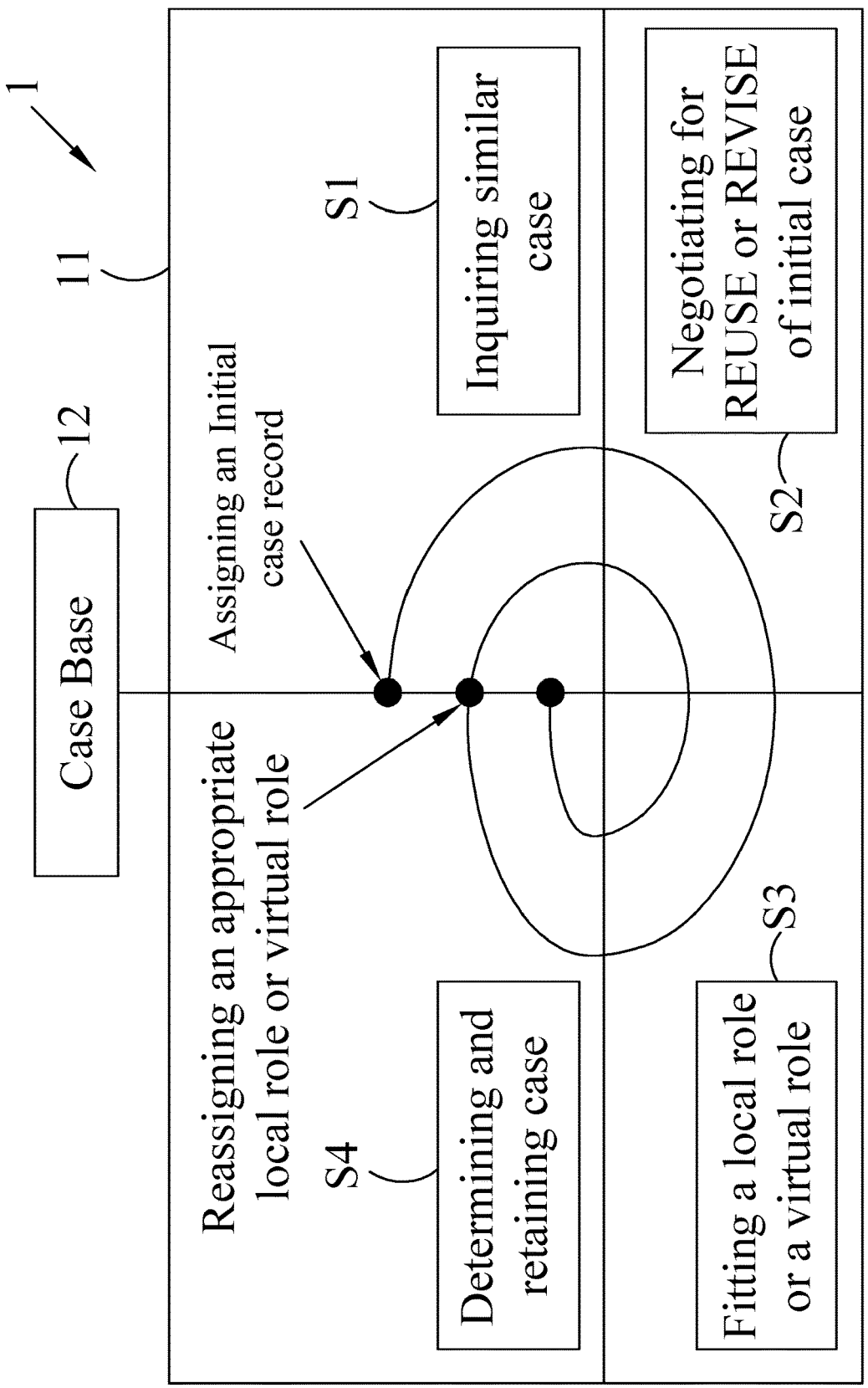

CBR-BASED NEGOTIATION RBAC METHOD FOR ENHANCING UBIQUITOUS RESOURCES MANAGEMENT

CROSS-REFERENCE TO RELATED APPLICATION

This application claims priority from Taiwan Patent Application No. 105140007, filed on Dec. 2, 2016 at the Taiwan Intellectual Property Office, the content of which is hereby incorporated by reference in its entirety for all purposes.

BACKGROUND OF THE INVENTION

1. Field of the Invention

The present invention relates to a CBR-based RBAC method and, in particular, relates to a CBR-based Negotiation RBAC Method for enhancing ubiquitous resources management.

2. Description of the Related Art

With progress in new technologies of information management, the Ubiquitous Resource Management (URM) platform is becoming popular. Because of the increasing number of people using applications (APPs), controlling access to resources on the related URM platform has become challenging. The management procedure can be simplified by grouping users having the same permissions. For example, the role-based access control (RBAC) model is a role-based method for a serving server to manage permission assignment to grouped users. RBAC is a powerful method that controls users' access permission in a big system. The concept of RBAC is that users are assigned with appropriate roles that are associated with corresponding permissions, wherein access to all resources is controlled by roles via the RBAC system. Therefore, permissions could be readily provided to users by simply assigning roles to each user. An organization's roles have to be designed to promote system and network security. Because URM can control the permissions of remote users, access control for remote access services is critically important for URM to prevent sensitive data from being accessed illegally. The management of the huge amount of users and the control of grouped users' secure accesses in URM systems is becoming a challenging problem.

Furthermore, there is also the huge challenge of controlling access to ubiquitous resources among multiple collaborative servers based on the negotiating security policies on URMs. The traditional access control mechanisms are insufficient to meet the requirements of role assignment management on URMs which provide accessing services for huge numbers of clients. Therefore, we need an innovative measure to solve these problems.

SUMMARY OF THE INVENTION

A purpose of the present invention is to solve the aforementioned problem by providing a role-based access control mechanism in a case-based reasoning negotiation method for the ubiquitous resources management.

Another purpose of the present invention is to provide the ubiquitous RBAC of CBR (Case-based Reasoning) based negotiation technique. By using a spiral negotiating process to meet the requirements of a negotiating role assignment (NRA) task and cooperative role assignment (CRA) task in a URM-platform, typical servers as well as cooperative servers may be managed effectively.

Another purpose of the present invention is to solve difficulties in reducing costs associated with a ubiquitous computing resource, e.g. reducing the role re-assignment rate, and handover rate between a local role and a virtual role, in order to save in wireless bandwidth and power consumption when performing role re-assignment or handover between a local role and a virtual role.

An embodiment of the present invention provides a CBR-based negotiation RBAC method for ubiquitous resources management. The method, which is applicable to a serving server, includes steps of inquiring for a similar case in a case base to obtain an initial case, performing a negotiation process for REUSE or REVISE of an initial case to assign at least one appropriate role set consisting of a local role and a virtual role, performing a local role and virtual role fitting process to fit the local role and the virtual role, and performing a determining and retaining process to meet the requirements of a user during the negotiation process.

The described details provide for a specific description of feasible embodiments. The claims of the present invention, however, are not limited to these embodiments; rather, the invention is to cover all modifications, equivalents, and alternatives falling within the spirit and scope of the appended claims.

BRIEF DESCRIPTION OF THE DRAWINGS

FIG. 1 is a flow chart of User-to-Local Role via a CBR-N procedure and a schematic diagram of an electronic system according to an embodiment of the present invention.

DESCRIPTION OF THE PREFERRED EMBODIMENTS

The purpose of the herein described embodiments is to illustrate the technical ideas and features of the present invention, such that one skilled in the art can comprehend the contents of the present invention and practice said invention accordingly. It should be understood, however, that the invention is not to be limited to the particular form disclosed; rather, the invention is to cover all modifications, equivalents, and alternatives falling within the spirit and scope of the appended claims.

The terms first, second, third, etc. are used herein to distinguish elements or operations described by the same terminology but not to imply order or sequence or to limit the scope of the present invention.

Unless otherwise defined, all terms used herein have common meanings as those used in the art. As a guideline for one skilled in the art to understand the present invention, some terms used herein will be discussed hereinafter or in other sections of the specification.

Among the URM platforms, the NRA task using a CBR-N model with a spiral negotiating process includes four steps: similar case inquiry, negotiating, fitting, and determining, wherein the CBR-N technique includes similar scenarios and corresponding cases inquiry, negotiating for REUSE or REVISE of an initial case, fitting a local role or a virtual role, and using case determining and retaining technique to find a similar case in order to re-assign the appropriate role(s) to users. The procedure may reduce the cost of ubiquitous computing resources, e.g., to reduce the role re-assignment rate or handover rate, and therefore to reduce the bandwidth usage, power consumption, etc. CBR-based negotiation process includes two procedures: User-to-Local Role via CBR-N procedure and User-to-Virtual Role CBR-based Negotiation procedure. The details are introduced below.

User-to-Local Role via CBR-N procedure is as follows.

The following refers to FIG. 1, which shows a flow chart of User-to-Local Role via a CBR-N procedure and a schematic diagram of an electronic system according to an embodiment of the present invention. As shown in FIG. 1, the electronic system 1 includes a serving server 11 and a case base 12. User-to-Local Role via a CBR-N procedure is applicable to the serving server 11, wherein the serving server 11 may be a Network Attached Storage server including a process circuit (not shown in the FIGURE) and a network module (not shown in the FIG.), which are coupled to one another. According to this embodiment, the network module provides network service for the serving server 11, such that the serving server 11 may communicate with the case base 12 through a wired or wireless network. For example, the network module may include one or more network interface circuits. The process circuit may further include at least one processor to run codes. The process circuit that runs codes controls the serving server 11, in order to perform the User-to-Local Role method via a CBR-N procedure of this embodiment. The codes may be, but are not limited to, a program module such as a software module or a firmware module. In this embodiment, the case base 12 may also be a Network Attached Storage server and have network functions. The case base 12 and the serving server 11 are individual devices in this embodiment. In other embodiments, the case base 12 may be integrated in the serving server 11.

In this embodiment, following a user's requests, the serving server 11 assigns the user a negotiated local role by using a CBR-based Negotiation (CBR-N) process in the NRA task.

In round $\tau_i$ during the spiral negotiation process, a step S1 includes inquiring for a similar case. Based on user requirements and the user's URM profile from system monitoring results, a CBR-based negotiation procedure is used to inquire for the most similar case within the similarity scenario in the case base of the server as an initial case. This step corresponds to a local role requesting and managing process.

In round $\tau_i$ during the spiral negotiation process, a step S2 includes negotiating for REUSE or REVISE of an initial case. According to the CBR-based negotiating procedure, a CBR case reuse or case revise technique is used to assign appropriate role(s) consisting of a local role if it is needed in the negotiating process, wherein the local role in this step is obtained by using the same local role in the inquired similar case recorded via the step S1. This step corresponds to a role assigning and managing process. This step corresponds to NRA tasks analysis and CBR-N process steps. In this step, the appropriate local role may be obtained through a negotiation equation N(•) shown below:

$$N(CR_{\tau_i}^{(i)} \ominus SR_{\tau_i}^{(x)}) = \langle nr_i^{(x)} \exists NR_i^{(x)} \rangle$$

The symbols in the equation are commonly used in the technique area. For example, '$\ominus$' is represented as the negotiation operation. During the time negotiation round, the detailed record of the requested initial case $CR_{\tau_i}^{(i)}$ provided by a client and detailed record of the fitting case $SR_{\tau_i}^{(x)}$ selected by the serving server are negotiated to output a negotiated role, which is also called the local role $nr_i^{(x)}$ assigned by the serving server x. The repetition is therefore omitted.

In round $\tau_i$ during the spiral negotiation process, a step S3 includes fitting a local role or a virtual role. The serving server 11 fits the local role by running the CBR-N procedure.

In round $\tau_i$ during the spiral negotiation process, a step S4 includes determining and retaining. An assigning role case determining technique of the CBR-N procedure is used to determine that the user accepts the role set, which includes at least one local role, assigned by the local serving server in the step S3. The purpose is to meet their requirements in the negotiation process and to store the case of the determined assigned local role in the case base.

The following demonstrates the assignment of the user to a virtual role through the CBR-N procedure in round $\tau_{i+1}$ of the spiral negotiation process.

The following also refers to FIG. 1, in which, following a user's request, the serving server 11 assigns the user a negotiated virtual role by using the NRA task CBR-N model with the spiral negotiation process in round $\tau_{i+1}$.

In round $\tau_{i+1}$ during the spiral negotiation process, a step S1 includes inquiring for a similar case. Based on user requirements and the characteristics of an initial case record, which is the initial case in round $\tau_i$, stored in the user's intelligent device, a CBR-N process is used to inquire for the most similar case with the similarity scenario in case base 12 to be an initial case in this round. This step corresponds to a virtual role requesting and managing process.

In round $\tau_{i+1}$ during the spiral negotiation process, a step S2 includes negotiation for REUSE or REVISE. Based on the CBR-N procedure, a CBR case reuse or case revise technique is used to assign fitted appropriate virtual roles. In this step, an appropriate virtual role is acquired through another negotiation equation N(•) shown below:

$$N(\langle CR_{\tau_i}^{(i)} \| SR_{\tau_i}^{(x)} \rangle \ominus SR_{\tau_{i+1}}^{(y)}) \langle nvr_{i+1}^{(i\ominus x\ominus y)}$$
$$\exists NVR_{i+1}^{(i\ominus x\ominus y)} \rangle$$

where the symbols in the equation are commonly used in the art. For example, '$\ominus$' is represented as the negotiation operation. During the time $\tau_{i+1}$ negotiation round in the negotiation equation N(•), the joint case of the detailed record $CR_{\tau_i}^{(i)}$ of the requested initial case provided by the client and the detailed record of the fitting case $SR_{\tau_i}^{(x)}$ selected by the serving server x is negotiated with the detailed record $SR_{\tau_{i+1}}^{(y)}$ of the case selected by serving server y in round $\tau_{i+1}$ to output a negotiated virtual role in round $\tau_{i+1}$, which is also called the virtual role $nvr_{i+1}^{(x)}$ assigned by the serving server y. The repetition is herein omitted.

In round $\tau_{i+1}$ during the spiral negotiation process, a step S3 includes fitting a local role or a virtual role. The serving server 11 fits a virtual role by running a CBR-N procedure on a cooperative server. This step corresponds to a role assigning and managing process.

In round $\tau_{i+1}$ during the spiral negotiation process, a step 4 includes case determining and retaining. A CBR-N assigning role case determining technique is used to ensure that a user accepts the role set, which includes at least one local role or virtual role, assigned by the local serving server with the spiral negotiation process of step 3 in round $\tau_i$ and by the cooperative server of step S3 in round $\tau_{i+1}$. The purpose is to acquire appropriate role sets for users, meet user requirements during the negotiation process and store the case of the determined role set assignment in the case base.

In conclusion, the present invention is novel and possesses several aforementioned extra benefits when compared to the conventional techniques and, thereby, meets the patentability requirements of novelty and non-obviousness. The inventor files the application in accordance with the law and expresses sincere gratitude should a patent be granted.

What is claimed is:

1. A method of role-based access control (RBAC) with case-based reasoning (CBR)-based negotiation for ubiquitous resources management (URM) to negotiate and assign a user with a local role on a serving server and a virtual role on a cooperative server, the method comprising at least:

a round $\tau_i$ assigning the local role, comprising steps of:
inquiring for a first similar case, from a case base storing at least one case, to serve as a first initial case, the inquiring being made based on requirements of the user, and the similar case being a most similar case within cases with similar scenarios in the case base;
performing a reuse or revise negotiating procedure on the first initial case to assign the local role to the user;
performing a local role fitting procedure to fit the local role in the first initial case on the serving server; and
performing a case determining and retaining procedure to meet the requirements of the user during the negotiation procedure, and storing, in the case base, the first initial case with a fitted local role when the user accepts the local role; and a round $\tau_{i+1}$ assigning the virtual role, comprising steps of:
inquiring a second similar case, from the case base, to serve as a second initial case in the round $\tau_{i+1}$, the inquiring being made based on the requirements of the user and the first initial case in the round $\tau_i$,
performing the reuse or revise negotiating procedure on the second initial case to assign the virtual role to the user;
performing a virtual role fitting procedure to fit the virtual role in the second initial case on the cooperative server; and
performing the case determining and retaining procedure to meet the requirements of the user during the negotiation procedure, and storing, in the case base, the second initial case with a fitted virtual role when the user accepts both the local role assigned by the serving server in the round $\tau_i$ and the virtual role assigned by the cooperative server in the round $\tau_{i+1}$.

2. The method of claim 1, wherein the step of obtaining the initial case in the round $\tau_i$ comprises:
inquiring the most similar case with a similarity scenario in the case base as the initial case based on a characteristic of the requirements from the user and a system monitoring result of a URM profile of the user.

3. The method of claim 1, wherein the step of assigning the local role in the round $\tau_i$ comprises:
assigning at least one appropriate role consisting of a same local role in the inquired similar case to the user.

4. The method of claim 1, wherein the local role and the virtual role are acquired respectively through a negotiation equation.

* * * * *